(12) United States Patent
Chiproot

(10) Patent No.: US 9,458,957 B2
(45) Date of Patent: Oct. 4, 2016

(54) MULTILAYER ANNULAR CLAMP

(75) Inventor: Avi Chiproot, Kfar-Saba (IL)

(73) Assignee: Krausz Industries Development Ltd., Tel Aviv (IL)

( * ) Notice: Subject to any disclaimer, the term of this patent is extended or adjusted under 35 U.S.C. 154(b) by 839 days.

(21) Appl. No.: 13/116,176

(22) Filed: May 26, 2011

(65) Prior Publication Data

US 2012/0299294 A1    Nov. 29, 2012

(51) Int. Cl.
F16L 17/00    (2006.01)
F16L 25/14    (2006.01)
F16L 21/02    (2006.01)
F16L 21/06    (2006.01)

(52) U.S. Cl.
CPC .............. *F16L 25/14* (2013.01); *F16L 21/022* (2013.01); *F16L 21/065* (2013.01)

(58) Field of Classification Search
USPC ................ 285/110, 111, 236, 148.26, 148.25
See application file for complete search history.

(56) References Cited

U.S. PATENT DOCUMENTS

| | | | |
|---|---|---|---|
| 4,480,860 A * | 11/1984 | Foresta et al. | 285/148.26 |
| 6,293,556 B1 | 9/2001 | Krausz | |
| 7,243,955 B2 * | 7/2007 | Krausz et al. | 285/236 |
| 7,571,940 B2 | 8/2009 | Krausz | |
| 7,654,586 B2 * | 2/2010 | Krausz et al. | 285/369 |
| 7,997,626 B2 * | 8/2011 | Krausz et al. | 285/110 |
| 2007/0273151 A1 * | 11/2007 | Krausz et al. | 285/406 |

FOREIGN PATENT DOCUMENTS

EP    1970613    9/2008

OTHER PUBLICATIONS

PCT Search Report PCT/US2015/039260, Sep. 24, 2012.

* cited by examiner

*Primary Examiner* — Aaron Dunwoody
(74) *Attorney, Agent, or Firm* — Dekel Patent Ltd.; David Klein

(57) ABSTRACT

A multilayer annular clamp including a plurality of sealing rings radially spaced from one another, at least two of the sealing rings including L-shaped axial-plane cross-sections nested in one another, an innermost one of the sealing rings being operative to contact an outer contour of the pipe, two clamp members disposed around a portion of the sealing rings, and a fastener, including a shank, operative to fasten the clamp members towards each other in a direction along the shank so as to apply a radially-inward clamping force on the innermost sealing ring that contacts the pipe so that the multilayer annular clamp clamps the pipe.

7 Claims, 2 Drawing Sheets

MULTILAYER ANNULAR CLAMP

FIELD OF THE INVENTION

The present invention relates generally to clamps and grip rings for pipes, and particularly to a multilayer annular clamp.

BACKGROUND OF THE INVENTION

Many kinds of removable band-type couplings for pipes exist in the art. It is noted that throughout the specification and claims, the term "pipe" encompasses any kind of generally cylindrical object.

U.S. Pat. No. 6,293,556 to Krausz describes a coupling for connecting pipes of the same or different diameters. The coupling has a ring shaped seal made of rubber or other resilient material, constructed of a first ring seal seated over a second ring seal. The seals can be easily disconnecting from one another to allow sealing against different diameter pipes. For smaller diameter pipes, both the first and second ring seals are used; for larger diameters, only one seal is used.

However, in some applications, the seals are subjected to considerable axial forces due to the fluids flowing in the pipe, sealing forces, clamping forces and other factors. It would be desirable to improve the ability of the seal to withstand such axial forces.

SUMMARY OF THE INVENTION

The present invention seeks to provide an improved clamp that improves the ability of the seal to withstand such axial forces, as is described more in detail hereinbelow. In addition, the assembly of the present invention has a very wide range of handling different diameter pipes and different materials of pipes (e.g., metal and plastic).

There is thus provided in accordance with an embodiment of the present invention a multilayer annular clamp including a plurality of sealing rings radially spaced from one another, at least two of the sealing rings including L-shaped axial-plane cross-sections nested in one another, an innermost one of the sealing rings being operative to contact an outer contour of the pipe, two clamp members disposed around a portion of the sealing rings, and a fastener, including a shank, operative to fasten the clamp members towards each other in a direction along the shank so as to apply a radially-inward clamping force on the innermost sealing ring that contacts the pipe so that the multilayer annular clamp clamps the pipe. In one embodiment, the L-shaped cross-section is a double-L-shaped (U-shaped) cross-section.

In accordance with an embodiment of the present invention at least one of the sealing rings (e.g., the outermost sealing ring) includes an outer portion folded over an inner portion so as to define an inner space between and bounded by the inner and outer portions.

In accordance with an embodiment of the present invention at least one pair of adjacent sealing rings are connected to each other by a male and female connection.

In accordance with an embodiment of the present invention some of the sealing rings are made of different materials and/or different thicknesses.

BRIEF DESCRIPTION OF THE DRAWINGS

The present invention will be understood and appreciated more fully from the following detailed description, taken in conjunction with the drawing in which:

FIGS. 1, 2, 3 and 4 are simplified right perspective, left perspective, sectional and end-view illustrations, respectively, of a multilayer annular clamp, constructed and operative in accordance with an embodiment of the present invention, wherein FIG. 3 is taken along section lines C-C in FIG. 2; and FIGS. 5, 6 and 7 are simplified perspective, sectional and end-view illustrations, respectively, of a multilayer annular clamp, constructed and operative in accordance with another embodiment of the present invention, wherein FIG. 6 is taken along section lines B-B in FIG. 5.

DETAILED DESCRIPTION OF EMBODIMENTS

Figure 1:
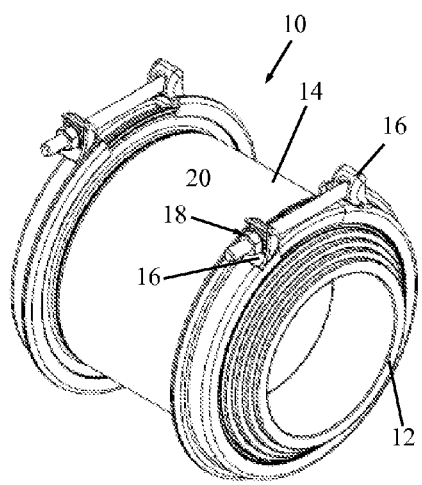
Figure 2:
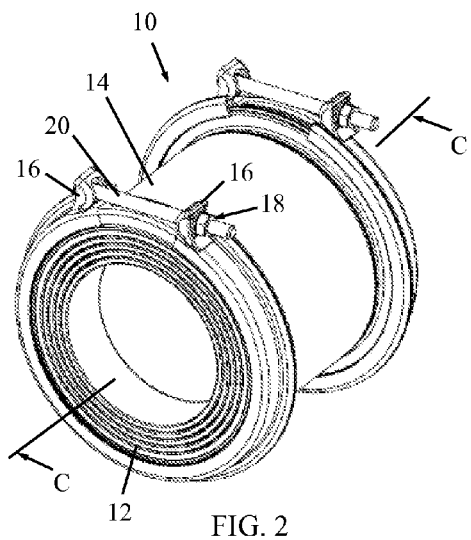

Reference is now made to FIGS. 1-4, which illustrate a multilayer annular clamp 10, constructed and operative in accordance with a non-limiting embodiment of the present invention.

Clamp 10 includes a plurality of sealing rings 12 radially spaced from one another and disposed in a housing 14, which may be cylindrical. Two clamp members 16 are disposed around a portion of the sealing rings 12. A fastener 18, including a shank 20, such as a bolt and nut fastener, fastens the clamp members 16 towards each other in a direction along shank 20 so as to apply a radially-inward clamping force on the innermost sealing ring 12 that is arranged to contact (surround) a pipe 22 (shown partially in broken lines in FIG. 3) placed in clamp 10.

Figure 3:
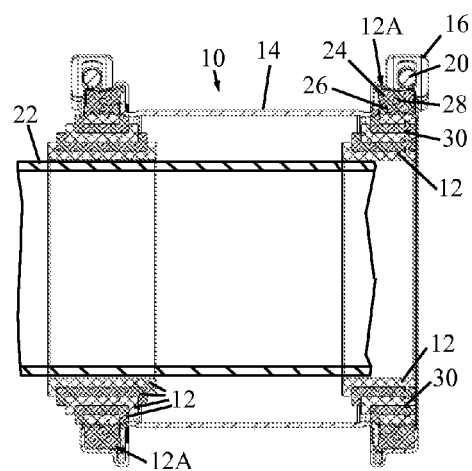
Figure 4:
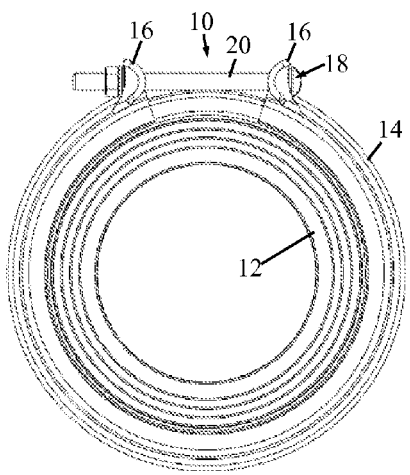

As seen in FIG. 3, the sealing rings 12 have L-shaped axial-plane cross-sections nested in one another. The innermost sealing ring 12 contacts an outer contour of pipe 22. In the embodiment of FIGS. 1-4, the right side set of sealing rings in FIG. 3 are L-shaped in axial-plane cross-section, whereas the left side set of sealing rings in FIG. 3 are double-L-shaped (U-shaped) in axial-plane cross-section. In other words, the U-shape is another form of the L-shape, combining minor images of two L-shapes. The L-shape (and U-shape) may have rounded corners (inner and outer). In an alternative embodiment, the one or more of the corners (inner and/or outer) may be sharp (radius zero). The sealing rings 12 may be made of any suitable sealing material, such as but not limited to, natural or synthetic rubber.

In accordance with an embodiment of the present invention, one or more of the sealing rings (designated by numeral 12A, generally the radially outermost sealing ring) includes an outer portion 24 folded over an inner portion 26 so as to define an inner space 28 between and bounded by the inner and outer portions 24 and 26. The inner space 28 is in fluid communication with a fluid (not shown) flowing in pipe 22. The fluid enters inner space 28 and applies pressure therein to increase tightening of the seal. Some of the sealing rings 12 may be removed from or added to some of the other sealing rings 12 to accommodate different pipe diameters; it is the innermost sealing ring that contacts the outer contour of pipe 22 and is tightened thereagainst.

In accordance with an embodiment of the present invention, one or more pairs of adjacent sealing rings are connected to each other by a male and female connection 30 (such as protrusions received in grooves or ridges and the like). This may help in increasing resistance to axial forces applied by the fluid in the pipe and the sealing forces against the pipe.

In accordance with an embodiment of the present invention some of the sealing rings are made of different materials, such as but not limited to, having different hardnesses, resilience, chemical resistance and other properties. In accordance with another embodiment of the present invention, some of the sealing rings may have different thicknesses.

Figure 5:
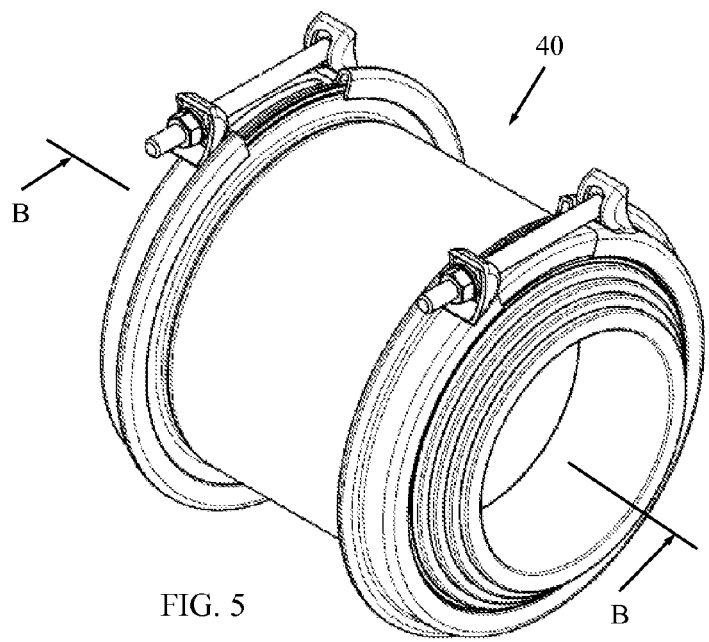
Figure 6:
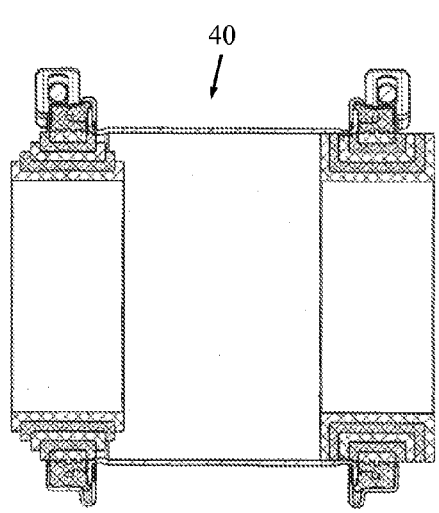
Figure 7:
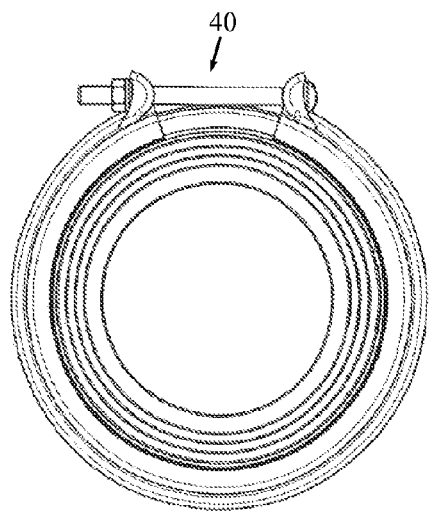

FIGS. 5-7 illustrate an almost identical multilayer annular clamp 40, wherein all the sealing rings are double-L-shaped (U-shaped) in axial-plane cross-section.

The scope of the present invention includes both combinations and subcombinations of the features described hereinabove as well as modifications and variations thereof which would occur to a person of skill in the art upon reading the foregoing description and which are not in the prior art.

What is claimed is:

1. A multilayer annular clamp comprising:
    a plurality of sealing rings radially spaced from one another, at least two of said sealing rings comprising L-shaped axial-plane cross-sections nested in one another, an innermost one of said sealing rings being operative to contact an outer contour of the pipe;
    two clamp members disposed around a portion of said sealing rings; and
    a fastener, comprising a shank, operative to fasten said clamp members towards each other in a direction along said shank so as to apply a radially-inward clamping force on the innermost sealing ring that contacts the pipe so that said multilayer annular clamp clamps the pipe.

2. The multilayer annular clamp according to claim 1, wherein said L-shaped cross-section comprises a double-L-shaped (U-shaped) cross-section.

3. The multilayer annular clamp according to claim 1, wherein at least one of said sealing rings comprises an outer portion folded over an inner portion so as to define an inner space between and bounded by said inner and outer portions.

4. The multilayer annular clamp according to claim 3, wherein said sealing ring that comprises said outer portion folded over said inner portion is the outermost sealing ring.

5. The multilayer annular clamp according to claim 1, wherein at least one pair of adjacent sealing rings are connected to each other by a male and female connection.

6. The multilayer annular clamp according to claim 1, wherein one or more of said sealing rings are made of different materials.

7. The multilayer annular clamp according to claim 1, wherein one or more of said sealing rings have different thicknesses.

* * * * *